US009526035B2

(12) United States Patent
Ibe et al.

(10) Patent No.: US 9,526,035 B2
(45) Date of Patent: *Dec. 20, 2016

(54) METHOD OF SEAMLESS ROAMING BETWEEN WIRELESS LOCAL AREA NETWORKS AND CELLULAR CARRIER NETWORKS

(71) Applicant: Cisco Technology, Inc., San Jose, CA (US)

(72) Inventors: Oliver C. Ibe, Andover, MA (US); Jianyu Zeng, Reading, MA (US)

(73) Assignee: Cisco Technology, Inc., San Jose, CA (US)

( * ) Notice: Subject to any disclaimer, the term of this patent is extended or adjusted under 35 U.S.C. 154(b) by 209 days.

This patent is subject to a terminal disclaimer.

(21) Appl. No.: 13/964,361

(22) Filed: Aug. 12, 2013

(65) Prior Publication Data
US 2013/0329697 A1 Dec. 12, 2013

Related U.S. Application Data

(60) Continuation of application No. 13/267,860, filed on Oct. 6, 2011, now Pat. No. 8,509,789, which is a continuation of application No. 12/874,183, filed on Sep. 1, 2010, now Pat. No. 8,041,360, which is a division of application No. 10/688,608, filed on Oct. 17, 2003, now Pat. No. 7,835,751.

(60) Provisional application No. 60/419,674, filed on Oct. 18, 2002.

(51) Int. Cl.
*H04W 36/00* (2009.01)
*H04W 36/14* (2009.01)
*H04W 36/30* (2009.01)
*H04W 88/06* (2009.01)

(52) U.S. Cl.
CPC ......... *H04W 36/0022* (2013.01); *H04W 36/14* (2013.01); *H04W 36/30* (2013.01); *H04W 88/06* (2013.01)

(58) Field of Classification Search
CPC ............. H04L 65/1069; H04L 65/1006; H04L 12/1403; H04L 12/1432; H04M 15/51; H04W 4/24; G06Q 20/145
See application file for complete search history.

(56) References Cited

U.S. PATENT DOCUMENTS

| 5,175,867 A | 12/1992 | Wejke et al. |
| 6,075,985 A | 6/2000 | Kao |
| 6,243,581 B1 | 6/2001 | Jawanda |

(Continued)

OTHER PUBLICATIONS

Final Office Action on U.S. Appl. No. 10/688,608, mailed May 22, 2007.
Final Office Action on U.S. Appl. No. 10/688,608, mailed Jun. 8, 2009.
Final Office Action on U.S. Appl. No. 13/267,860, mailed Feb. 5, 2013.

(Continued)

*Primary Examiner* — Jung Park

(57) ABSTRACT

A scheme that enables seamless roaming between the WLAN and the cellular carrier network by enabling a user that originates a call in the WLAN and happens to go outside the range of the WLAN to automatically switch over to the cellular carrier network without losing connection with the other party. This solution assumes that the mobile device has the capability to operate in at least two modes that include the WLAN mode and one of the cellular carrier modes, such as the GSM, IS-95 CDMA, IS-136 TDMA, and iDEN.

20 Claims, 3 Drawing Sheets

(56) References Cited

U.S. PATENT DOCUMENTS

| | | |
|---|---|---|
| 6,711,146 B2 | 3/2004 | Yegoshin |
| 6,766,171 B2 | 7/2004 | Pan et al. |
| 6,904,277 B2 | 6/2005 | Tsutsumi et al. |
| 6,961,573 B1 | 11/2005 | Moon et al. |
| 7,089,005 B2 | 8/2006 | Reddy |
| 7,177,636 B2 | 2/2007 | Oda et al. |
| 7,197,029 B1* | 3/2007 | Osterhout et al. ............ 370/353 |
| 7,203,482 B2 | 4/2007 | Blumenthal et al. |
| 7,356,015 B2 | 4/2008 | Ibe et al. |
| 7,391,748 B2 | 6/2008 | Feather |
| 7,835,751 B2 | 11/2010 | Ibe et al. |
| 8,041,360 B2 | 10/2011 | Ibe et al. |
| 2002/0035699 A1 | 3/2002 | Crosbie |
| 2002/0068559 A1 | 6/2002 | Sharma et al. |
| 2002/0085516 A1 | 7/2002 | Bridgelall |
| 2002/0114318 A1 | 8/2002 | Rines |
| 2002/0131387 A1* | 9/2002 | Pitcher et al. ................ 370/338 |
| 2003/0134638 A1 | 7/2003 | Sundar et al. |
| 2003/0134650 A1 | 7/2003 | Sundar et al. |
| 2003/0156566 A1 | 8/2003 | Griswold et al. |
| 2004/0002330 A1 | 1/2004 | Chitrapu |
| 2004/0002335 A1 | 1/2004 | Pan et al. |
| 2004/0008645 A1 | 1/2004 | Janevski et al. |
| 2004/0028009 A1 | 2/2004 | Dorenbosch et al. |
| 2004/0072593 A1 | 4/2004 | Robbins et al. |
| 2005/0101245 A1 | 5/2005 | Ahmavaara |
| 2005/0124288 A1 | 6/2005 | Karmi et al. |
| 2006/0013170 A1 | 1/2006 | Shin et al. |

OTHER PUBLICATIONS

Final Office Action on U.S. Appl. No. 13/267,860, mailed May 1, 2012.
Final Office Action on U.S. Appl. No. 10/688,608, mailed Jan. 26, 2006.
Non-Final Office Action on U.S. Appl. No. 10/688,608, mailed Nov. 30, 2006.
Non-Final Office Action on U.S. Appl. No. 10/688,608, mailed Nov. 5, 2008.
Non-Final Office Action on U.S. Appl. No. 10/688,608, mailed Dec. 1, 2009.
Non-Final Office Action on U.S. Appl. No. 10/688,608, mailed Mar. 18, 2008.
Non-Final Office Action on U.S. Appl. No. 10/688,608, mailed Jun. 19, 2007.
Non-Final Office Action on U.S. Appl. No. 12/874,183; mailed Feb. 1, 2011.
Non-Final Office Action on U.S. Appl. No. 13/267,860, mailed Sep. 13, 2012.
Non-Final Office Action on U.S. Appl. No. 13/267,860, mailed Nov. 21, 2011.
Non-Final Office Action on U.S. Appl. No. 10/688,608, mailed Aug. 10, 2005.
Notice of Allowance on U.S. Appl. No. 10/688,608, mailed Jun. 8, 2010.
Notice of Allowance on U.S. Appl. No. 12/874,183, mailed Jun. 30, 2011.
Notice of Allowance on U.S. Application 13/267860k, mailed Apr. 15, 2013.

* cited by examiner

METHOD OF SEAMLESS ROAMING BETWEEN WIRELESS LOCAL AREA NETWORKS AND CELLULAR CARRIER NETWORKS

CROSS-REFERENCE TO RELATED PATENT APPLICATIONS

This application is a Continuation of U.S. application Ser. No. 13/267,860, filed Oct. 6, 2011, which is a Continuation of U.S. application Ser. No. 12/874,183, filed Sep. 1, 2010, (now U.S. Pat. No. 8,041,360), which is a divisional application of U.S. patent application Ser. No. 10/688,608, filed on Oct. 17, 2003, now U.S. Pat. No. 7,835,751, which claims the benefit of provisional application Ser. No. 60/419,674 filed on Oct. 18, 2002, all of which are incorporated by reference herein in its entirety.

BACKGROUND

The proliferation of the wireless local area networks (WLANs) has led to the search for ways in which its utilization can be increased. By WLAN, we include all instantiations of such technologies as 802.11 a, 802.11 b, 802.11 g, Bluetooth and any similar WLAN versions. For example, the specification for the IEEE 802.11 version of WLAN includes an access scheme called the distributed control function, which permits the network to support both data and voice applications. Today voice over wireless local area network (VoWLAN) is a reality. The voice may be encoded and transmitted using voice over internet protocol (VoIP) format and protocols such as G.711, G.726, G.729, SIP, MEGACO, H.323, or other similar protocols that are being developed.

One of the issues in WLAN is that there is a limited range of operation due to power requirements. For example, a typical IEEE 802.11 WLAN has a range of at most 300 yards from the access point that connects the mobile devices to the wired LAN. Thus, when an IEEE 802.11-based mobile device roams beyond this range, any call in progress is forcibly terminated.

SUMMARY

The present disclosure concerns a scheme that enables seamless roaming between the WLAN and the cellular carrier network. In an embodiment, the cellular carrier network is a wide area wireless network. The method enables a user that originates a call in the WLAN and happens to go outside the range of the WLAN to automatically switch over to the cellular carrier network without losing connection with the other party. This solution assumes that the mobile device has the capability to operate in at least two modes that include the WLAN mode and one of the cellular carrier modes, such as the GSM, IS-95 CDMA, IS-136 TDMA, and iDEN.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

A typical WLAN is comprised of access points (APs) that are connected to the enterprise LAN via an access controller (AC) or a wireless LAN switch. In an embodiment, the WLAN may include wireless local links to various devices. The access controller/wireless LAN switch AC is the center of intelligence of the WLAN and is responsible for admission control, authentication and mobile device roaming coordination. In an embodiment, the access controller/wireless LAN switch AC may include a computing device. One AC/wireless LAN switch can control several APs and multiple ACs/wireless LAN switches can be in the same network. Another device called the Cellular Proxy (CP) is a gateway that connects the enterprise LAN to the cellular network. In an embodiment, the CP may include a computing device. If the enterprise PBX is not VoIP-capable, the cellular proxy also provides the VoIP interface between the enterprise LAN and the PBX. The Cellular Proxy is located in the part of the enterprise building that has a very good cellular coverage.

The Cellular Proxy is not necessarily tightly coupled to any cellular network. To any cellular network, it is a bank of radios. It hides the details of the movement of the mobile devices within the enterprise premises from the cellular network thereby preventing the cellular network from making frequent updates to its database. Also, it can connect to multiple cellular networks simultaneously because it contains radios for different types of cellular network technologies, such as CDMA, AMPS TDMA, GSM TDMA, iDEN, WCDMA, CDMA2000, GPRS, 1×RTT, 1×EVDO, and 1×EVDV. Thus, the Cellular Proxy can proxy for mobile devices in CDMA-based and TDMA-based cellular networks simultaneously.

Figure 1:
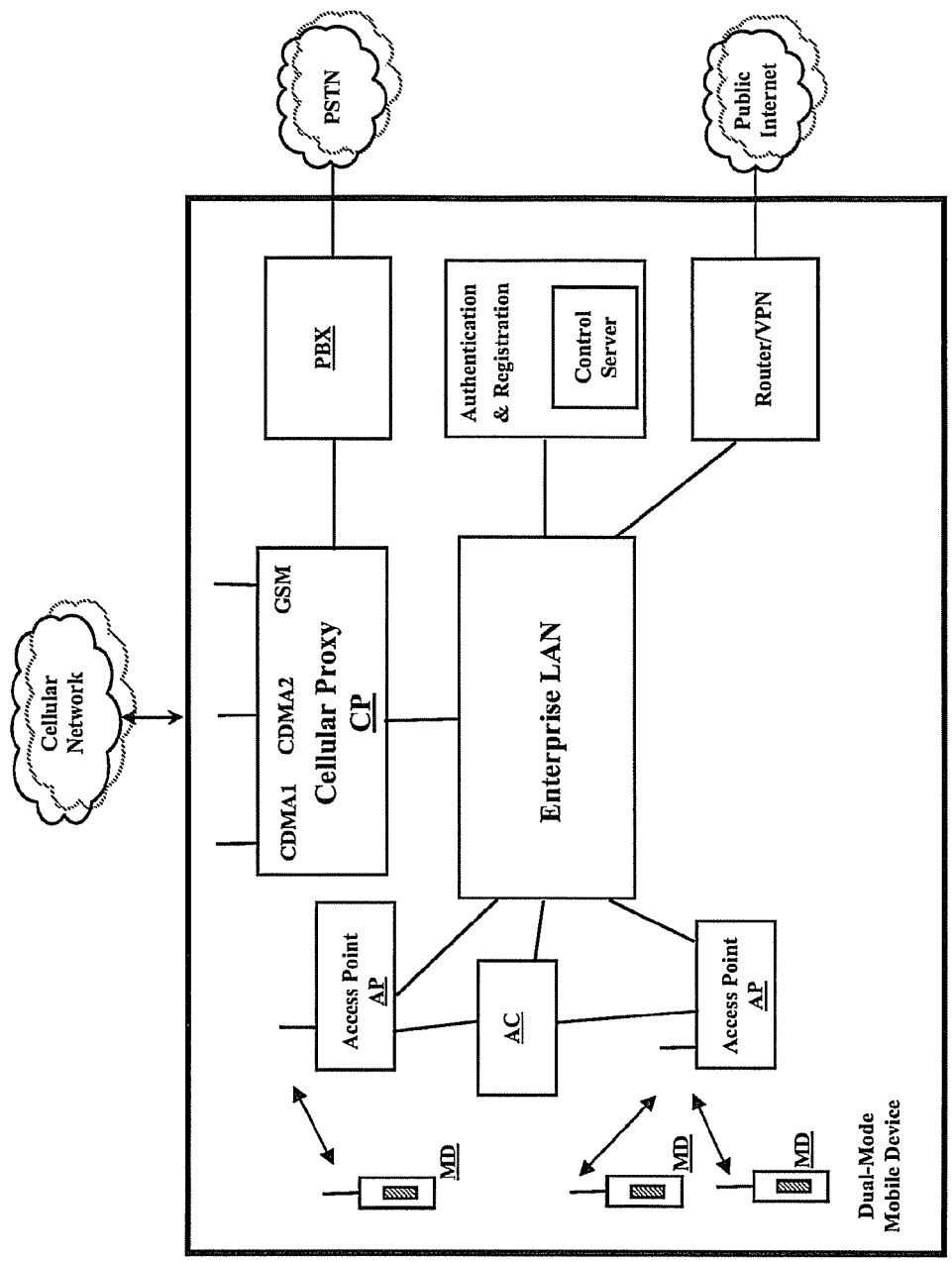
FIG. 1 is a block diagram showing the architecture of a typical WLAN that supports Voice communications.

Mobile devices, such as laptops that are equipped with wireless network interface cards and personal digital assistants access the network via the APs. A typical network is shown in FIG. 1. In the figure, the access controller and/or wireless LAN switch are not shown; they are assumed to be part of the enterprise LAN infrastructure.

Each dual-mode mobile device MD has two telephone numbers: one number is assigned by the enterprise as an extension of the enterprise's PBX, and the other number is assigned by the cellular carrier. The default network for each mobile device is the enterprise (or hotspot) WLAN, which means that when a mobile device is turned on, it first searches for the enterprise's WLAN and registers with the network, if it is found. If the enterprise WLAN is not found the mobile device MD then registers with the cellular carrier network. The rationale for this operational requirement is to save the enterprise money by ensuring that mobile device users do not accrue air charges when they are within the corporate WLAN. All calls generated by the mobile device while it is on the enterprise network are routed via the corporate PBX to the public switched telephone network (PSTN).

Since each mobile device has two telephone numbers, it can be reached in two ways: via the PBX when calls come from the PSTN, and via the Cellular Proxy CP when calls come from the Cellular Proxy. Regardless of how the calls arrive, they are converted into voice over IP (VoIP) packets by the appropriate device and presented to the mobile device via the WLAN. These calls are based on the Session Initiation Protocol (SIP), which has the advantage over the ITU-T H.323 protocol in that it is a lightweight protocol that leverages the Internet protocols.

Figure 2:
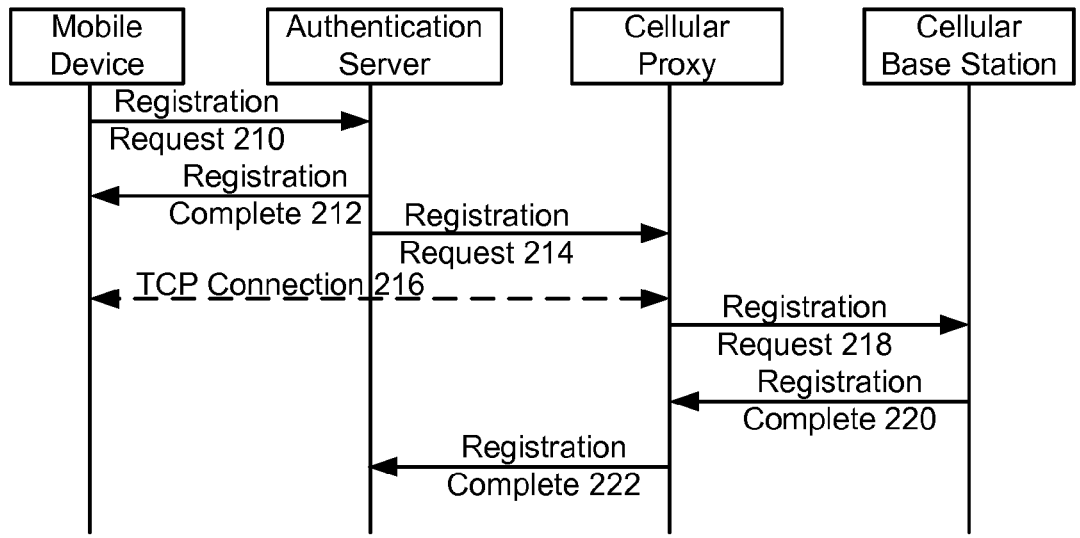
FIG. 2 is a timing diagram showing the initial mobile device registration process.

Each mobile device MD goes through an initialization process when it is turned on in the WLAN. As discussed earlier, the default network is the enterprise WLAN. Therefore, when a mobile device is turned on it sends a Registration Request message to the appropriate authentication server in the enterprise LAN. After the authority server has authenticated the mobile device, it returns a Registration Complete message to the device. The authentication server, which has information on each mobile device's cellular service provider's network, then sends a Registration Request message to the Cellular Proxy instructing the latter to register the mobile device in the device's cellular carrier network. The Cellular Proxy CP first sets up a TCP connection to the mobile device MD via the appropriate access controller (or wireless LAN switch) and access point before commencing the registration of the device in the cellular network. After the Cellular Proxy has successfully registered the mobile device in the cellular network, it returns a Registration Complete message to the authentication server. The Cellular Proxy then starts listening on the appropriate paging channel for calls destined for the mobile device from the cellular carrier network and will deliver such calls to the mobile device via the appropriate access controller (or the wireless LAN switch) and access point. The message flow for the registration process is illustrated in FIG. 2.

Consider a dual-mode mobile device that originates a call within a WLAN. As the user moves closer to the edge of the network the signal quality begins to degrade. The degradation will reach a point where the signal strength is almost imperceptible, which causes the call to be terminated.

Here, the mobile device MD has the capability to monitor the signal quality by measuring the signal-to-noise ratio (SNR). Assume also that from practical experience acquired through measurements it is known that when SNR reaches some threshold value d, the voice quality becomes unacceptable. The goal is to prevent the call quality from degrading to this critical point. Thus, when the SNR drops to a cutoff value r>d, the system initiates a handoff with the objective of completing the handoff procedure before the SNR drops down to the threshold value d. Thus the scheme operates in the following manner:

When a mobile device experiences SNR measurement value of r, it sends a Handoff Request message to the Cellular Proxy via the TCP connection that exists between the two devices.

When Cellular Proxy receives the message it takes one of two actions that depend on where the device of the other party in the call is located.

If the device of the other party is located in the PSTN, which means that the call passes through the PBX, then it takes the following actions: 1) the Cellular Proxy uses one of its own carrier-assigned telephone numbers to call the mobile device's carrier-assigned telephone number; 2) since the mobile device is not physically connected to the cellular network, the Cellular Proxy will also receive the call on behalf of the device; 3) after receiving the parameters of the call from the cellular network, such as the channel or code to use, power level, etc., the Cellular Proxy will forward these parameters to the mobile device over the TCP connection that it established between the two and commands the mobile device to switch its radio to the cellular network using those parameters; 4) the Cellular Proxy will then close the TCP connection, stop proxying for that device in the cellular network to avoid cloning problems, and will thereafter forward the call to the mobile device over the new connection established via the cellular network; and 5) on receiving the call parameters, the mobile device will immediately switch its radio to the cellular network without having to register again since it has already been registered and authenticated in the cellular controller by the Cellular Proxy. As it moves from base station to base station outside the enterprise network, the mobile device will be subject to the handoff mechanism that applies within the cellular network.

Figure 3:
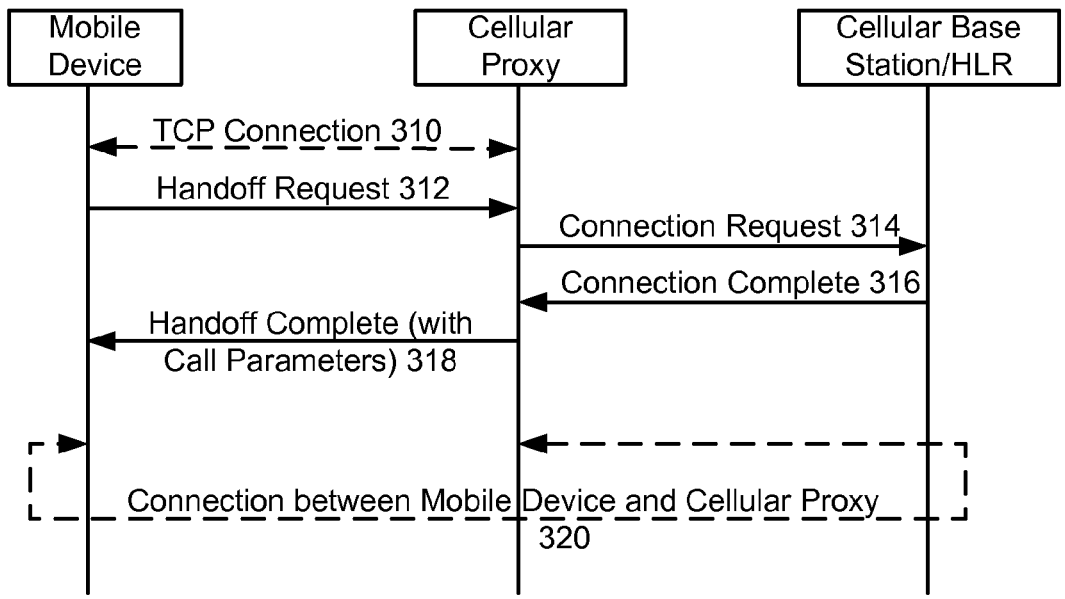
FIG. 3 is a timing diagram showing the handoff procedure for a mobile device with a PSTN-based call in progress.

This sequence of activities is illustrated in FIG. 3.

If the device of the other party is located in the cellular carrier network, which means that the call passes through the Cellular Proxy without reaching the PBX, it takes the following set of actions: 1) since the Cellular Proxy has all the parameters of the call, it returns these parameters to the mobile device via the TCP connection between the two and commands the mobile device to switch its radio to the cellular network using those parameters; 2) the Cellular Proxy will then close the TCP connection and stop proxying for the mobile device to avoid creating cloning problems in the cellular network; 3) Upon receiving the information, the mobile device will tune its radio to the channel currently used by the Cellular Proxy and receive the call directly from the cellular network.

Figure 4:
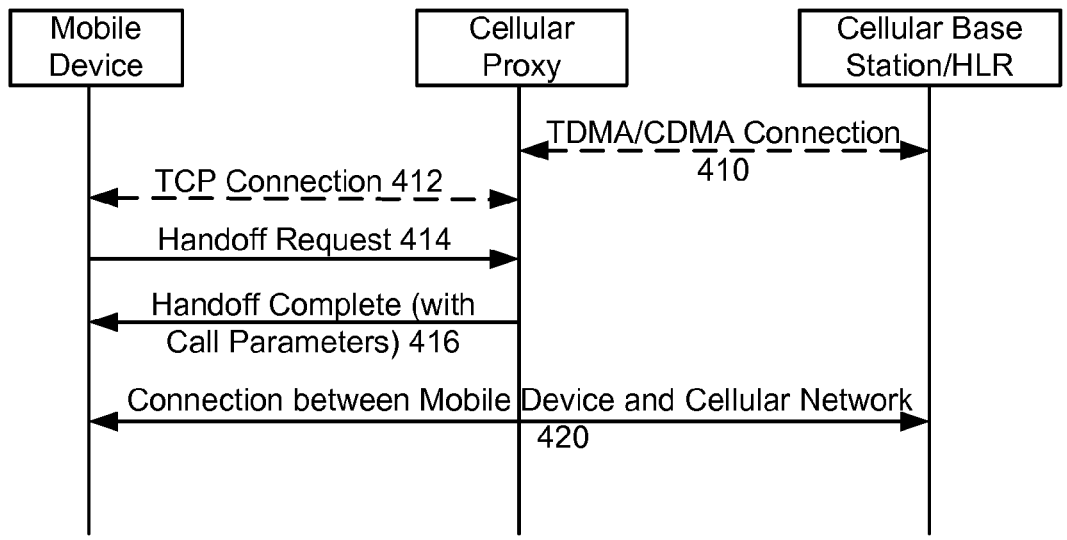
FIG. 4 is a timing diagram showing the handoff procedure for a mobile device with cellular network-based call in progress.

This sequence of activities is illustrated in FIG. 4.

Assume that the mobile device has a call in progress as it is moved from the outside world into the enterprise premises. The operational rule is that if there is good cellular coverage within the enterprise premises, the call will be allowed to complete in the cellular network after which the mobile device will register in the enterprise LAN using the procedure described earlier. However, if there is no good coverage within the enterprise premises, the device will initiate a handoff with the Cellular Proxy. The procedure is as follows:

1) if the SNR reaches the predefined cutoff value, the mobile device sends a short message service (SMS) message to the Cellular Proxy. The message contains information on the identity of the mobile device, such as its PBX extension and its cellular network telephone number as well as the parameters of the current call. The Cellular Proxy maintains a record of the cellular network that each enterprise mobile device is associated with. Therefore, with the information it received from the mobile device the Cellular Proxy sends a message to the authentication server to expedite the authentication of the mobile device.

2) The authentication server will provide emergency registration for the mobile device by broadcasting a Registration Invite message that the mobile device will respond to.

3) After locating and authenticating the mobile device, the authentication server forwards the device's location and network configuration parameters like the IP address to the Cellular Proxy.

4) After sending the emergency registration request to the authentication server, the Cellular Proxy will start monitoring the channel on which the mobile device was communicating and accumulating information destined for the device until the device has been authenticated and registered in the network 5) When the Cellular Proxy receives information on the device's location, it will set up a TCP connection to the device and forward all accumulated packets to the device.

6) After this, the operation becomes similar to that described earlier. The Cellular Proxy listens on the channel and relays information between the mobile device and the cellular network until the conversation is over and the connection is terminated. When the current call ends, the Cellular Proxy continues to listen on the cellular network's paging channel for calls destined for the mobile device, as described earlier.

Figure 5:
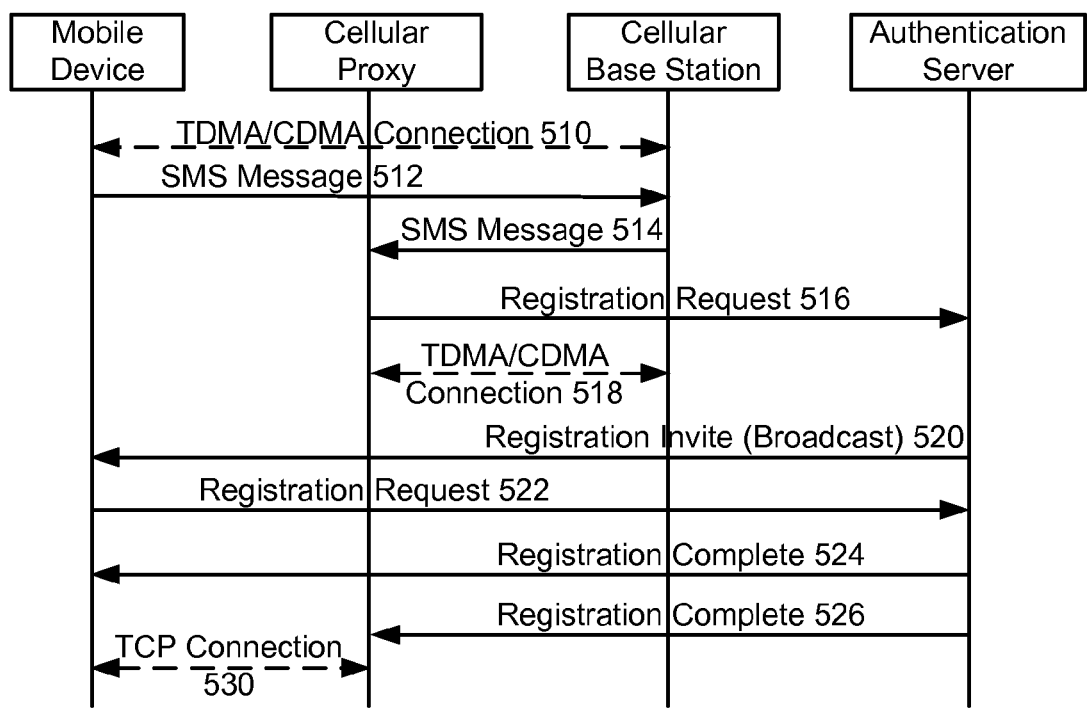
FIG. 5 is a timing diagram showing the procedure for cellular network-to-WLAN handoff.

This sequence of activities is illustrated in FIG. 5.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method comprising:
    facilitating, by proxying at a computing device, a communication session between a first device connected to the computing device through a wireless local link of a wireless local area network and a second device connected to a cellular wide area network, wherein the computing device is local to the first device during at least a portion of the communication session, and wherein the computing device directly connects to the wireless local area network and directly connects to the cellular wide area network via a cellular base station through a cellular radio as a cellular radio endpoint; and
    communicating, during the communication session, voice data transmitted via session initiation protocol (SIP), wherein the voice data comprises voice over IP (VoIP) packets, wherein the communication session includes a first communication path and a second communication path, wherein the first communication path connects the second device through the cellular wide area network to the computing device and then to the first device via the wireless local link between the first device and the computing device, and wherein the second communication path connects the second device though the cellular wide area network to the first device and does not include the wireless local area network, and
    switching from the first communication path to the second communication path, controlled by the computing device, when a signal quality of the wireless local link approaches a pre-determined threshold.

2. The method of claim 1, wherein the computing device comprises a radio interface configured to interface the wireless local link.

3. The method of claim 1, wherein the computing device comprises a plurality of cellular radios to access a plurality of cellular wide area networks configured to operate according to a plurality of protocols.

4. The method of claim 1, wherein the computing device is located at a building, and wherein the first device is located at the building during at least a portion of the communication session.

5. The method of claim 1, further comprising determining the signal quality of the wireless local link.

6. The method of claim 5, wherein determining the signal quality of the wireless local link comprises measuring a signal-to-noise ratio across the wireless local link.

7. The method of claim 1, wherein switching from the first communication path to the second communication path comprises receiving a handoff request message at the computing device.

8. The method of claim 1, wherein the computing device hides the movement of the first device from cellular base stations when the first device is connected to the computing device via the wireless local link.

9. A device comprising:
    a first radio terminal configured to directly connect to a wireless local area network;
    a second radio terminal configured to directly connect to a cellular wide area network via a connection to a cellular base station as a cellular radio endpoint; and
    a computing device connected to the first radio terminal and to the second radio terminal and configured to:
        facilitate, by proxying, a communication session between a first device and a second device, wherein the computing device is local to the first device during at least a portion of the communication session, and wherein the computing device is connected to the first device through a wireless local link of the wireless local area network and connected to the second device via the cellular wide area network; and
        communicate, during the communication session, voice data transmitted via session initiation protocol (SIP), wherein the voice data comprises voice over IP (VoIP) packets, wherein the communication session includes a first communication path and a second communication path, wherein the first communication path connects the second device through the cellular wide area network to the computing device and then to the first device via the wireless local link and wherein the second communication path connects the second device though the cellular wide area network to the first device and does not include the wireless local area network, and
        switch from the first communication path to the second communication path, under control of the computing device, when a signal quality of the wireless local link approaches a pre-determined threshold.

10. The device of claim 9, further comprising a radio interface configured to interface the wireless local link.

11. The device of claim 9, wherein the device is further configured to determine the signal quality of the wireless local link.

12. The device of claim 11, wherein the computing device is configured to determine the signal quality of the wireless local link by measuring a signal-to-noise ratio across the wireless local link.

13. The device of claim 12, wherein the computing device is configured to switch from the first communication path to the second communication path by receiving a handoff request message from the first device.

14. The device of claim 9, wherein the device is further configured to connect to a plurality of cellular wide area networks, wherein each of the plurality of cellular wide area networks operates according to a different cellular network protocol.

15. The apparatus of claim 9, wherein the second radio terminal comprises a plurality of cellular radios to access a plurality of cellular wide area networks configured to operate according to a plurality of protocols.

16. A system comprising:
a first device directly connected to a wireless local area network;
a second device coupled to a cellular wide area network; and
a computing device configured to:
facilitate, by proxying, a communication session between the first device and the second device, wherein the computing device is local to the first device during at least a portion of the communication session, wherein the computing device directly connects to the wireless local area network and directly connects to the cellular wide area network via a cellular base station through a cellular radio as a cellular radio endpoint,
communicate, during the communication session, voice data transmitted via session initiation protocol (SIP), wherein the voice data comprises voice over IP (VoIP) packets, wherein the communication session includes a first communication path and a second communication path, wherein the first communication path connects the second device through the cellular wide area network to the computing device and then to the first device via a wireless local link of the wireless local area network to the first device and does not include the wireless local area network, and wherein the second communication path connects the second device though the cellular wide area network to the first device and does not include the wireless local area network, and
switch from the first communication path to the second communication path, under control of the computing device, when a signal quality of the wireless local link approaches a pre-determined threshold.

17. The system of claim 16, wherein the computing device comprises a radio interface configured to interface the wireless local link.

18. The system of claim 16, wherein the computing device is further configured to determine the signal quality of the wireless local link.

19. The system of claim 16, wherein the computing device comprises a plurality of cellular radios to access a plurality of cellular wide area networks configured to operate according to a plurality of protocols.

20. The system of claim 16, wherein the computing device is located at a building, and wherein the first device is located at the building during at least a portion of the communication session.

* * * * *